(12) United States Patent
Morita

(10) Patent No.: US 7,223,487 B2
(45) Date of Patent: May 29, 2007

(54) FUEL CELL SYSTEM

(75) Inventor: Koji Morita, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 393 days.

(21) Appl. No.: 10/795,280

(22) Filed: Mar. 9, 2004

(65) Prior Publication Data

US 2004/0191585 A1 Sep. 30, 2004

(30) Foreign Application Priority Data

Mar. 27, 2003 (JP) ............................. 2003-089092

(51) Int. Cl.
- *H01M 8/00* (2006.01)
- *H01M 8/04* (2006.01)
- *H01M 8/10* (2006.01)
- *H01M 8/12* (2006.01)
- *H01M 8/18* (2006.01)

(52) U.S. Cl. ........................... 429/13; 429/19; 429/26; 429/25; 429/17

(58) Field of Classification Search .................. None
See application file for complete search history.

(56) References Cited

U.S. PATENT DOCUMENTS

| | | | |
|---|---|---|---|
| 4,622,275 A * | 11/1986 | Noguchi et al. | ............ 429/19 |
| 5,360,679 A | 11/1994 | Buswell et al. | |
| 5,573,867 A | 11/1996 | Zafred et al. | |
| 6,379,829 B1 | 4/2002 | Kurita | |
| 6,528,193 B1 | 3/2003 | Kurita | |
| 6,755,399 B2 | 6/2004 | Shimanuki et al. | |
| 2001/0021468 A1 | 9/2001 | Kanai et al. | |
| 2002/0006537 A1 | 1/2002 | Kobayashi et al. | |
| 2004/0151958 A1* | 8/2004 | Formanski et al. | ........... 429/26 |

FOREIGN PATENT DOCUMENTS

| | | |
|---|---|---|
| JP | 02-061392 A | 3/1990 |
| JP | 04-169073 A | 6/1992 |
| JP | 7-71795 A | 3/1995 |
| JP | 2000-182647 A | 6/2000 |
| JP | 2001-202978 A | 7/2001 |
| JP | 2002-042842 A | 2/2002 |
| JP | 2002-56865 A | 2/2002 |
| JP | 2003-031244 A | 1/2003 |
| JP | 2003-086208 A | 3/2003 |
| JP | 2004-044458 A | 2/2004 |
| WO | WO 98/29918 A1 | 7/1998 |
| WO | WO 02/39514 A2 | 5/2002 |
| WO | WO 03/021702 A1 | 3/2003 |

* cited by examiner

*Primary Examiner*—Dah-Wei Yuan
*Assistant Examiner*—Karie O'Neill
(74) *Attorney, Agent, or Firm*—Foley & Lardner LLP

(57) ABSTRACT

A fuel cell system including a fuel cell, an air compressor for supplying compressed air to the fuel cell, an expander for recovering energy from the air discharged from the fuel cell, and a heat exchanger for exchanging heat between the air discharged from the compressor and the air discharged from the fuel cell. The air discharged from the fuel cell is supplied to the expander after flowing through the heat exchanger.

9 Claims, 8 Drawing Sheets

FUEL CELL SYSTEM

BACKGROUND OF THE INVENTION

1. Field of Invention

The present invention relates to a fuel cell system, particularly to a system for reducing energy consumption of an air feeding system in a fuel cell system, which efficiently cools air to be fed to a fuel cell thereof.

2. Description of Related Art

In a fuel cell, fuel gas such as hydrogen gas and oxidizing gas containing oxygen electrochemically react to produce electric current, which is taken out of a pair of electrodes provided on both sides of an electrolyte membrane. Especially, Polymer Electrolyte Fuel Cell using a solid polymer electrolyte has drawn attention as a power source of an electrical vehicle due to low operating temperature and easy handling. A fuel cell vehicle carries a hydrogen storage device, such as a high-pressure hydrogen tank, a liquid hydrogen tank, or a hydrogen storage alloy tank, and a fuel cell to which hydrogen gas is supplied from the hydrogen storage device to react with air. Electric energy produced by the reaction is taken out of the fuel cell to drive a motor connected to driving wheels. The fuel cell vehicle is thus an ultimate clean vehicle, which discharges only water.

In the fuel cell system, pressurization of air to be supplied to the air electrode has the following advantages.

(1) Increase in the oxygen partial pressure in the air, which contributes to an increase in a generated voltage and the power generation efficiency of the fuel cell.
(2) Because of an increase in the total pressure of the air, less moisture needs to be added at a gas temperature for creating moist air having the same dew point.
(3) Because of an increase in the total pressure of the air, the dew point rises, and the relative humidity can be maintained high in the fuel cell.
(4) Because the volume flow rate of the air is reduced, the cross-sectional area of a gas flow path in the fuel cell can be made smaller as long as the pressure loss is in an allowable range.

However, the pressurization of air to be supplied has the following disadvantages.

(1) Increase in electric power consumed by a compressor for pressurization.
(2) Temperature rise in the compressed air, resulting in an increase in capacity and in running cost of a cooler for lowering the raised temperature of the compressed air to an allowable temperature for the fuel cell.

The Japanese Patent Laid-Open Publication No. 2002-56865 discloses a fuel cell system, in which the energy consumption of the compressor is reduced by providing the system with an expander for recovering energy from the discharged air of the fuel cell, and a gas-gas heat exchanger to lower the temperature of the compressed air by exchanging heat between outlet air of the compressor and outlet air of the expander, which is cooled by adiabatic expansion therein.

SUMMARY OF THE INVENTION

In the above-described system, the gas-gas heat exchanger reduces the amount of heat released from a radiator, however the amount of heat in the discharged air is increased instead. In other words, although the load of the cooler is reduced in the above-described system, means for releasing heat is just changed, accordingly, the system efficiency is not improved, and the number of parts is increased in the entire system.

The present invention is made in the light of this problem. An object of the present invention is to provide a fuel cell system which is simply constructed and low in cost.

Another object of the present invention is to provide a fuel cell system with an enhanced energy-efficiency.

An aspect of the present invention is a fuel cell system comprising: a fuel cell having a fuel electrode to which a fuel gas is supplied and an air electrode to which air is supplied; a compressor for compressing air and supplying the compressed air to the air electrode; an expander for recovering energy from the air discharged from the air electrode; and a heat exchanger which exchanges heat between the air discharged from the compressor and the air discharged from the air electrode, wherein the air discharged from the air electrode is supplied to the expander after flowing through the heat exchanger.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
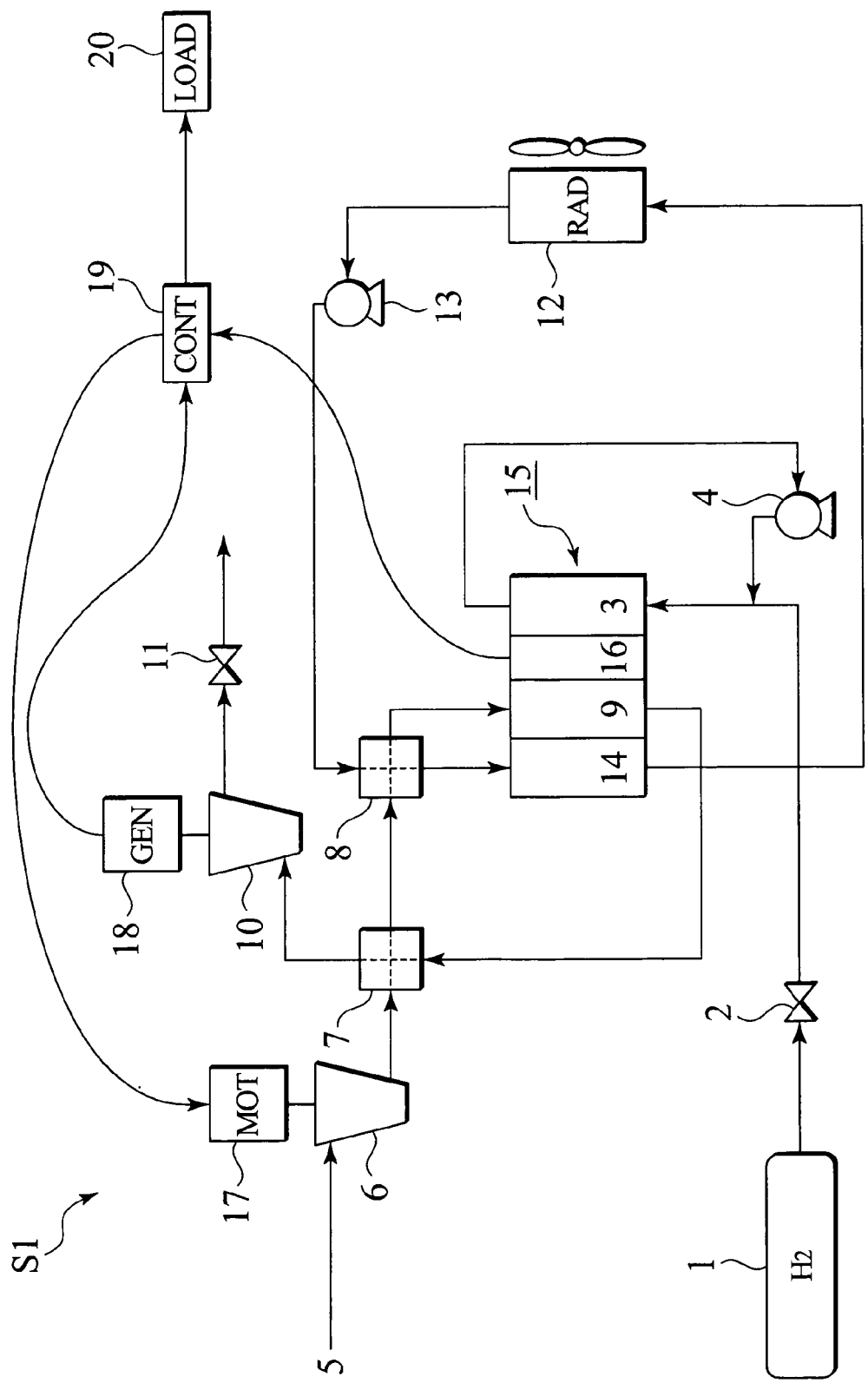
FIG. 1 is a diagram of a fuel cell system according to a first embodiment of the present invention.

Embodiments of the present invention will be explained below with reference to the drawings, wherein like members are designated by like reference characters.

First Embodiment

FIG. 1 shows a diagram of a fuel cell system S1 according to a first embodiment of the present invention.

In FIG. 1, the fuel cell system S1 includes a hydrogen tank 1, a pressure regulating valve 2, a fuel electrode 3, a circulating pump 4, an air intake 5, a compressor 6, an gas-gas heat exchanger 7, a liquid-gas heat exchanger 8, an air electrode 9, an expander 10, a pressure regulating valve 11, a radiator 12, a cooling water pump 13, a cooling water passage 14 of a fuel cell 15, an electrolyte membrane 16 sandwiched between the fuel electrode 3 and the air electrode 9, a compressor driving motor 17, a generator 18, a controller 19, and a load 20. The hydrogen tank 1 stores hydrogen gas. The pressure regulating valve 2 regulates hydrogen gas pressure. The fuel electrode 3 is supplied with hydrogen gas. The circulating pump 4 pumps to circulate hydrogen gas from an outlet to an inlet of the fuel electrode. The compressor 6 compresses air taken from the air intake 5. The gas-gas heat exchanger 7 cools the air which has been compressed by the compressor 6 to have a raised temperature. The liquid-gas heat exchanger 8 further cools the air cooled by the gas-gas heat exchanger 7. The air electrode 9 is supplied with the compressed and cooled air. The expander 10 expands the air discharged from the air electrode 9. The pressure regulating valve 11 regulates the pressure of air discharged from the expander 10. The radiator 12 releases heat of the cooling water. The cooling water pump 13 pumps to circulate the cooling water. The compressor driving motor 17 rotates to drive the compressor 6. The generator 18 is driven to rotate by the expander 10. The load 20 is fed with electric power generated by the fuel cell 15.

Next, a description will be given of the operation of the fuel cell system S1.

Hydrogen gas as fuel gas is supplied from the hydrogen tank 1 storing hydrogen gas at high pressure, through the pressure regulating valve 2, to the fuel electrode 3 of the fuel cell 15. Generally, it is necessary to supply fuel gas and air more than the amount to be consumed for power generation so as to evenly distribute the fuel gas and air to the entire fuel and air electrodes. Also in the fuel cell system S1, hydrogen gas more than the amount to be consumed for the power generation is supplied to the fuel electrode 3. The excess hydrogen gas which is not consumed in the fuel electrode 3 is discharged from the outlet of the fuel electrode 3. After being pumped by the circulating pump 4, the discharged hydrogen gas is mixed with newly supplied hydrogen gas whose pressure is regulated by the pressure regulating valve 2 and supplied again to the fuel electrode 3.

The compressor 6 sucks air from the air intake 5 and compresses the air to a predetermined operating pressure. The air compressed by the compressor 6 to have a high temperature is cooled by the gas-gas heat exchanger 7. The cooled air flows through the liquid-gas heat exchanger 8 to be further cooled, and then supplied to the air electrode 9 of the fuel cell 15.

The excess air discharged from the outlet of the air electrode 9 (outlet air of the air electrode) is heated again when flowing through the gas-gas heat exchanger 7. The heated air is decompressed to near the atmospheric pressure by the expander 10, and then released into the atmosphere after flowing through the pressure regulating valve 11.

After cooled by the radiator 12, the cooling water is pumped by the cooling water pump 13 and supplied to the liquid-gas heat exchanger 8, by which the cooling water supplied thereto is heated. The cooling water from the liquid-gas heat exchanger 8 flows through the cooling water passage 14 and heated by heat exchange with the fuel cell 15. Subsequently, the cooling water is fed to the radiator 12 to be cooled again and then circulated.

In the fuel electrode 3, hydrogen is separated into protons (hydrogen ions) and electrons at the electrode catalyst on the surface of the electrolyte membrane 16. The separated protons are transported toward the air electrode 9 through the electrolyte membrane 16. At this time, the electrons move from the fuel electrode 3 through the controller 19 to the air electrode 9, whereby the electric power is taken out.

At the electrode catalyst on the surface of the electrolyte membrane 16 on the air electrode 9 side, the protons which have been transported through the electrolyte membrane 16, the electrons which have flowed through the controller 19, and oxygen in the compressed air meets and reacts with each other, forming water.

The controller 19 distributes the electric power generated by the fuel cell 15 and the generator 18 driven by the expander 10 to the load 20 and the compressor driving motor 17 which drives the compressor 6.

Next, a description will be given of the operation effect of the fuel cell system S1. When air at 30° C. is compressed by the compressor 6, the air temperature at the outlet of the compressor is about 220° C., the power consumption of the compressor driving motor 17 is about 17 kW.

In the gas-gas heat exchanger 7, high temperature air at about 220° C. and low temperature air (outlet air of air electrode) at about 80° C. exchange heat with each other to have temperatures of about 120° C. and about 160° C., respectively. The amount of heat exchanged in the gas-gas heat exchanger 7 is about 8 kW.

In the liquid-gas heat exchanger 8, high temperature air at about 120° C. exchanges heat with the cooling water to have a temperature of about 80° C. The amount of heat exchanged in the liquid-gas heat exchanger 8 is about 3 kW.

When the air at about 160° C. is expanded with the expander 10, the amount of electricity generated by the generator 18, which is driven to rotate by the expander 10, is about 5 kW.

With this configuration, the amount of heat to be released from the radiator 12 is reduced by about 8 kW compared to the case of cooling the air from the compressor only with the liquid-gas heat exchanger 8. Accordingly, it is possible to allocate a larger amount of heat to be released to the fuel cell 15. Alternatively, the capacities of the radiator 12 and the liquid-gas heat exchanger 8 can be reduced.

Further, with this configuration, the energy recovered by the expander 10 is increased by about 3 kW compared to the case without the gas-gas heat exchanger 7. Accordingly, it is possible to allocate more electricity generated by the fuel cell 15 to the load 20.

As described above, the fuel cell system S1 is provided with the heat exchanger which performs heat exchange between the air discharged from the compressor and the outlet air of the air electrode of the fuel cell, and the expander thereof is supplied with the outlet air of the air electrode having flowed through the heat exchanger. Accordingly, the temperature of the inlet air of the air electrode of the fuel cell, which is the air discharged from the compressor, is lowered, and the capacity of the cooler which cools the inlet air of the air electrode of the fuel cell (or radiator load) can be reduced or the cooler can be omitted. This allows simplification of the system construction and reduction in costs.

Moreover, since the temperature of the air supplied to the expander rises, the amount of energy recovered by the expander, or the amount of electricity generated by the generator is increased, whereby the system efficiency is improved.

Note that the liquid-gas heat exchanger 8 may be omitted in the case where the gas-gas heat exchanger 7 has a higher heat exchange performance.

Second Embodiment

Figure 2:
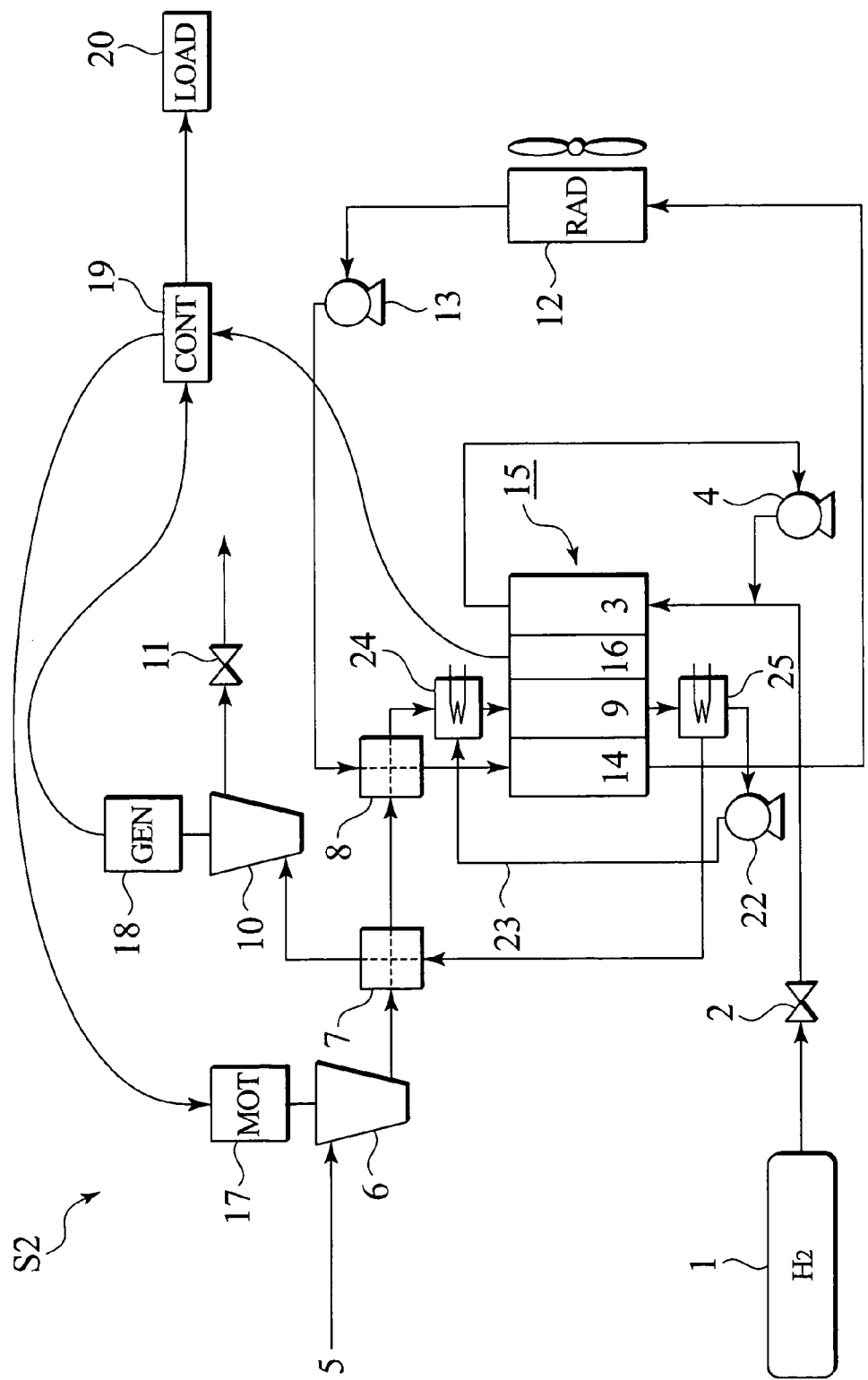
FIG. 2 is a diagram of a fuel cell system according to a second embodiment of the present invention.

FIG. 2 shows a diagram of a fuel cell system S2 according to a second embodiment of the present invention.

In the fuel cell system S2, a condenser 25, a pump 22, a water line 23, and a humidifier 24 are added as components of a humidifying system to the fuel cell system S1. The condenser 25 recovers water from the outlet air of the air electrode. The pump 22 pumps the recovered water. The water line 23 is a flow path for the water. The humidifier 24 humidifies air to be supplied to the air electrode. Other components are the same as those of the fuel cell system S1, which are given the same numerals, and the repeated description thereof is omitted.

Next, a description will be given of the operation of the fuel cell system S2.

The outlet air of the air electrode 9 of the fuel cell 15 is cooled at the condenser 25 to be separated into dry gas and liquid. The separated dry gas is introduced to the gas-gas heat exchanger 7. The separated water is supplied through the water line 23 to the humidifier 24 by the pump 22. The humidifier 24 humidifies the compressed air whose temperature has been lowered by the liquid-gas heat exchanger 8, and the humidified compressed air is supplied to the air electrode 9 of the fuel cell 15. Supplying the humidified air to the air electrode in this manner activates the electrochemical reaction within the fuel cell, whereby pressures of air and hydrogen gas supplied to the fuel cell 15 can be reduced.

According to the fuel cell system S2, in addition to the effects of the fuel cell system S1, it is possible to easily maintain air to be supplied at a proper humidity due to the humidifying system. Moreover, the operating pressure can be reduced, whereby the energy consumed by the compressor can be reduced.

Moreover, the provision of the condenser allows the water recovery from the discharged air of the fuel cell, eliminating the need for storing a large amount of water.

Third Embodiment

Figure 3:
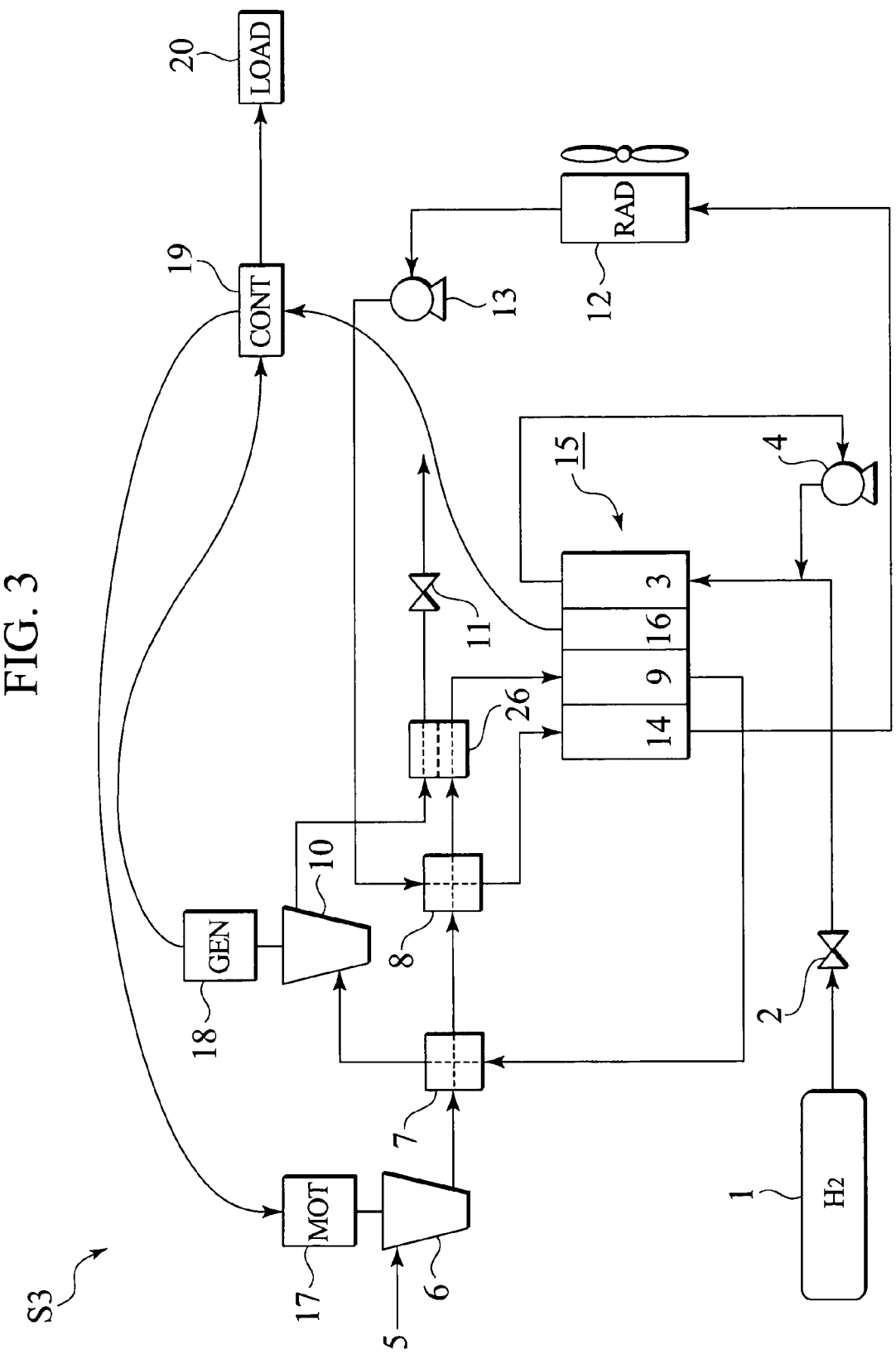
FIG. 3 is a diagram of a fuel cell system according to a third embodiment of the present invention.

FIG. 3 shows a diagram of a fuel cell system S3 according to a third embodiment of the present invention.

In the fuel cell system S3, a dehumidifier (moisture exchanger) 26 is added to the fuel cell system S1 as a humidifying device at the exit of the expander 10. The dehumidifier 26 includes porous hollow fibers in a bundle. The other components are the same as those of the fuel cell system S1, which are given the same numerals, and the repeated description thereof is omitted.

As the dehumidifier 26 in the fuel cell system S3, a hollow fiber membrane type moisture exchanger using hollow fiber membranes can be used, which is shown in the Japanese Patent Laid-Open Publication No. 7(1995)-71795. This hollow fiber membrane type moisture exchanger accommodates a bundle of hollow fiber membranes within the housing. The hollow fiber membranes are obtained by making polymer membranes such as polyimide or fluoropolymer membranes into hollow fiber shape. The hollow fiber membrane type moisture exchanger allows the transportation of water vapor between gas flowing inside the hollow fiber membranes and gas flowing outside the hollow fiber membranes. The water vapor is transported from high humidity gas to low humidity gas through the hollow fiber membranes thereof.

Next, a description will be given of the operation of the fuel cell system S3.

Similarly to the fuel cell system S, the outlet air of the air electrode 9 of the fuel cell 15 flows through the gas-gas heat exchanger 7 and is introduced to the inlet of the expander 10. The outlet air of the expander 10 is introduced to the dehumidifier 26. The outlet air of the liquid-gas heat exchanger 8 is also introduced to the dehumidifier 26.

The outlet air of the expander 10 is wet, containing moisture generated in the fuel cell 15, while the outlet air of the liquid-gas heat exchanger 8 is dry. The porous hollow fibers of the dehumidifier 26 have a function of transporting water vapor from the wet air to the dry air. Therefore, the outlet air of the liquid-gas heat exchanger 8 is humidified when flowing through the dehumidifier 24 and then introduced to the air electrode 9 of the fuel cell 15.

As described above, according to the fuel cell system S3, the humidifying device supplies moisture contained in the outlet air of the air electrode, which has been flown through the expander, to the inlet air of the air electrode. Accordingly, it is possible to supply moisture-containing high-energy air, which has not been flown through the condenser, directly to the expander. Therefore, the fuel cell system S3 can recover more energy than the fuel cell system S2, further enhancing the system efficiency.

Moreover, since the membrane type dehumidifier is used as the humidifying device, the number of units can be reduced compared to the humidifying system as used in the fuel cell system S2. Furthermore, no anti-icing measure is required since the water line is not provided.

Fourth Embodiment

Figure 4:
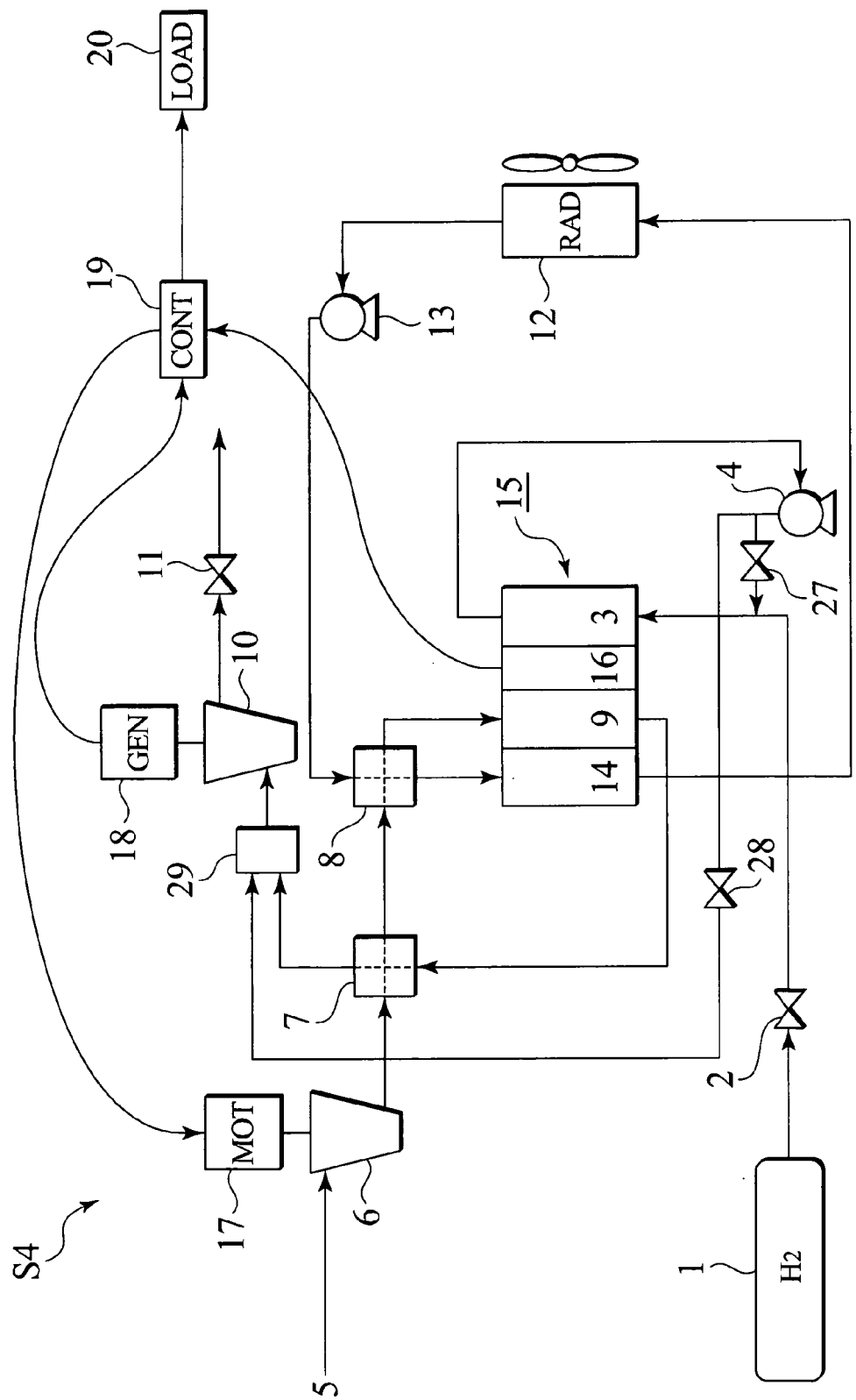
FIG. 4 is a diagram of a fuel cell system according to a fourth embodiment of the present invention.

FIG. 4 shows a diagram of a fuel cell system S4 according to a fourth embodiment of the present invention.

In a fuel cell system S4, valves 27 and 28 and a combustor 29 are added to the fuel cell system S1. The valve 27 is provided between the outlet of the circulating pump 4 and the inlet of the fuel electrode 3. The valve 28 is provided between the outlet of the circulating pump 4 and the inlet of the combustor 29. The other components are the same as those of the fuels cell system S1, which are given the same numerals, and the repeated description is omitted.

Next, a description will be given of the operation of the fuel cell system S4.

In the hydrogen gas circulation system, unused or unreacted hydrogen gas discharged from the outlet of the fuel electrode 3 is supplied to the inlet of the fuel electrode 3 to be reused, and water vapor or nitrogen passed through the electrolyte membrane 16 from the air electrode 9 to the fuel electrode 3 is accumulated in the system. This causes reduction in the hydrogen partial pressure, and in the efficiency of the fuel cell 15. Therefore, there is a need for purging (or scavenging) of hydrogen gas containing the impurities in the hydrogen gas circulation system.

The valve 28 is provided to purge such hydrogen gas. When the valve 28 is opened, in purging, the valve 27 is closed to prevent the fuel gas from the hydrogen tank 1 from being directly discharged.

The purged hydrogen and the air from the outlet of the air electrode 9 of the fuel cell 15, which has been heated by the gas-gas heat exchanger 7, are supplied to the combustor 29 to be combusted. The exhaust gas of the combustor 29 is introduced to the expander 10.

Since the temperature of the exhaust gas of the combustor 29 is high, the energy recovered by the expander 10, which is the electricity generated by the generator 18, is increased compared to the case of the fuel cell system S1 without the combustor 29 and the like.

As described above, according to the fuel cell system S4, the fuel gas unused in the fuel cell is burned and introduced to the expander. Therefore, it is possible to inactivate the purged gas from the fuel electrode. Moreover, it is possible to recover more energy from the generator than in the fuel cell system S1 since the energy of the gas introduced to the expander is increased.

Fifth Embodiment

Figure 5:
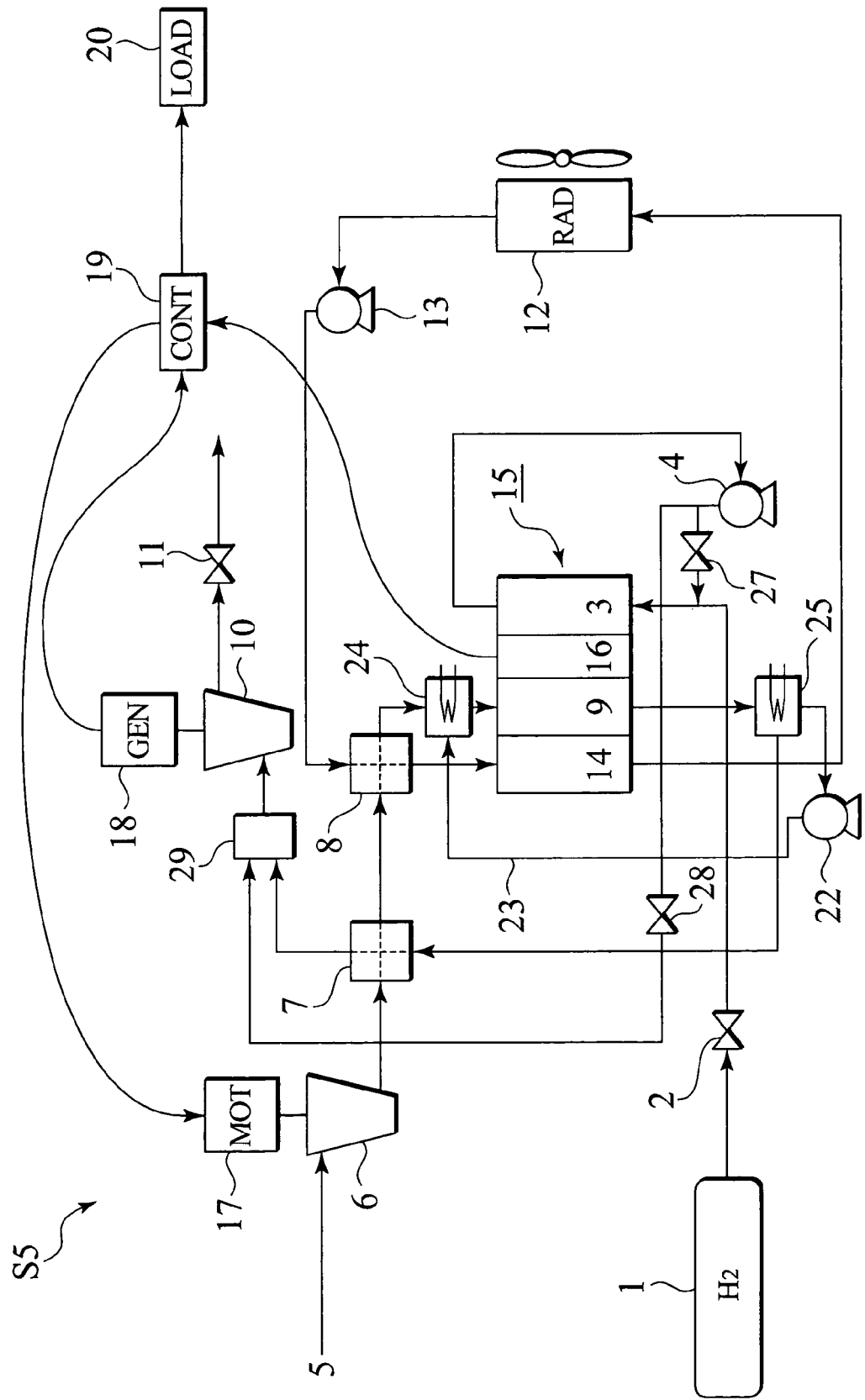
FIG. 5 is a diagram of a fuel cell system according to a fifth embodiment of the present invention.

FIG. 5 shows a diagram of a fuel cell system S5 according to a fifth embodiment of the present invention.

In a fuel cell system S5, the condenser 25, the pump 22, the water line 23, and the humidifier 24, which are the same as those of the fuel cell system S2, are added to the fuel cell system S4 as components of a humidifying system. The functions of these components are the same as those of the fuel cell system S2. The other components are the same as those of the fuel cell system S4, which are given the same numerals, and the repeated description is omitted.

Next, a description will be given of the operation of the fuel cell system S5.

Similarly to the fuel cell system S4, the valve 28 is opened to purge hydrogen gas containing impurities accumulated in the hydrogen gas circulation system. The valve 27 is closed to prevent the fuel from the hydrogen tank 1 from being directly discharged when the valve 28 is opened in purging.

The purged hydrogen gas is supplied to the combustor 29 through the valve 28. Moreover, the outlet air of the air electrode 9, from which moisture has been removed by the condenser 25, is heated by the gas-gas heat exchanger 7 and supplied to the combustor 29. These gases are mixed and combusted in the combustor 29, and the exhaust gas is introduced to the expander 10.

According to the fuel cell system S5, in addition to the effect of the fuel cell system S4, the provision of the humidifying system facilitates maintaining the air supplied to the air electrode 9 at a proper humidity. Moreover, since the operating pressure of the air in the fuel cell can be lowered, the energy consumed by the compressor 6 can be reduced.

The humidifying system takes moisture in the outlet air of the air electrode 9 before being supplied to the combustor 29, and adds to the inlet air of the air electrode 9. Accordingly, the dried outlet air is supplied to the combustor, and the ignition capability of the combustor is improved, thus increasing the combustion efficiency. The humidifying system is effective especially in the case where the combustor is a catalytic combustor or the like.

Furthermore, since the condenser 25 is provided, the moisture removed from the fuel cell 15 can be recovered, thus eliminating the need for storing a large amount of water.

Sixth Embodiment

Figure 6:
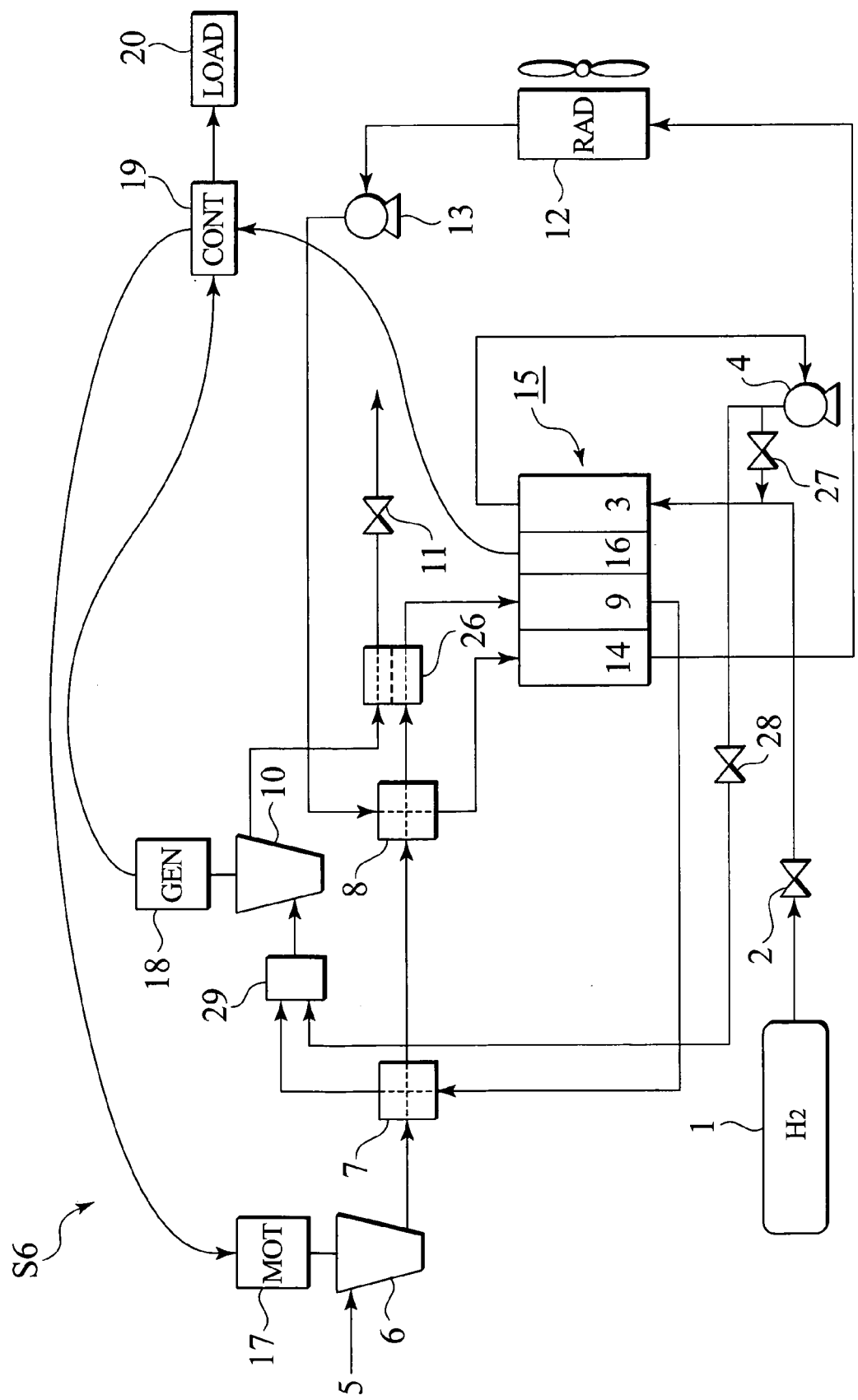
FIG. 6 is a diagram of a fuel cell system according to a sixth embodiment of the present invention.

FIG. 6 shows a diagram of a fuel cell system S6 according to a sixth embodiment of the present invention.

In a fuel cell system S6, the dehumidifier 26 which is the same as that of the fuel cell system S3 is added to the fuel cell system S4 as a humidifying device at the outlet of the expander 10. The dehumidifier 26 includes porous hollow fibers in a bundle. The configuration and function of the dehumidifier 26 itself are the same as those of the fuel cell system S3. The other components are the same as those of the fuel cell system S4, which are given the same numerals, and the repeated description thereof is omitted.

Next, a description will be given of the operation of the fuel cell system S6.

Similarly to the fuel cell system S4, the valve 28 is opened to purge hydrogen gas containing impurities accumulated in the hydrogen gas circulation system. The valve 27 is closed to prevent the fuel from the hydrogen tank 1 from being directly discharged when the valve 28 is opened in purging.

The purged hydrogen gas is supplied to the combustor 29 through the valve 28, while the outlet air of the air electrode 9 is heated by the gas-gas heat exchanger 7 and supplied to the combustor 29. These gases are mixed and burned in the combustor 29, and the exhaust gas is introduced to the expander 10. The exhaust gas containing water vapor, which is discharged from the expander 10, is introduced to the dehumidifier 26. In the dehumidifier 26, the water vapor in the exhaust gas at high temperature and humidity is transported to the air cooled by the liquid-gas heat exchanger 8. The air humidified by the dehumidifier 26 is supplied to the air electrode 9.

According to the fuel cell system S6, in addition to the effect of the fuel cell system S4, the provision of the humidifying device facilitates maintaining the air supplied to the air electrode 9 at a proper humidity. Moreover, since the operating pressure is lowered, the energy consumed by the compressor 6 can be reduced.

The humidifying device adds moisture in the exhaust gas after the expander 10 to the inlet air of the air electrode 9. Accordingly, the expander can be supplied with moisture-containing high energy exhaust gas, whereby more energy can be recovered than the fuel cell system S5.

Seventh Embodiment

Figure 7:
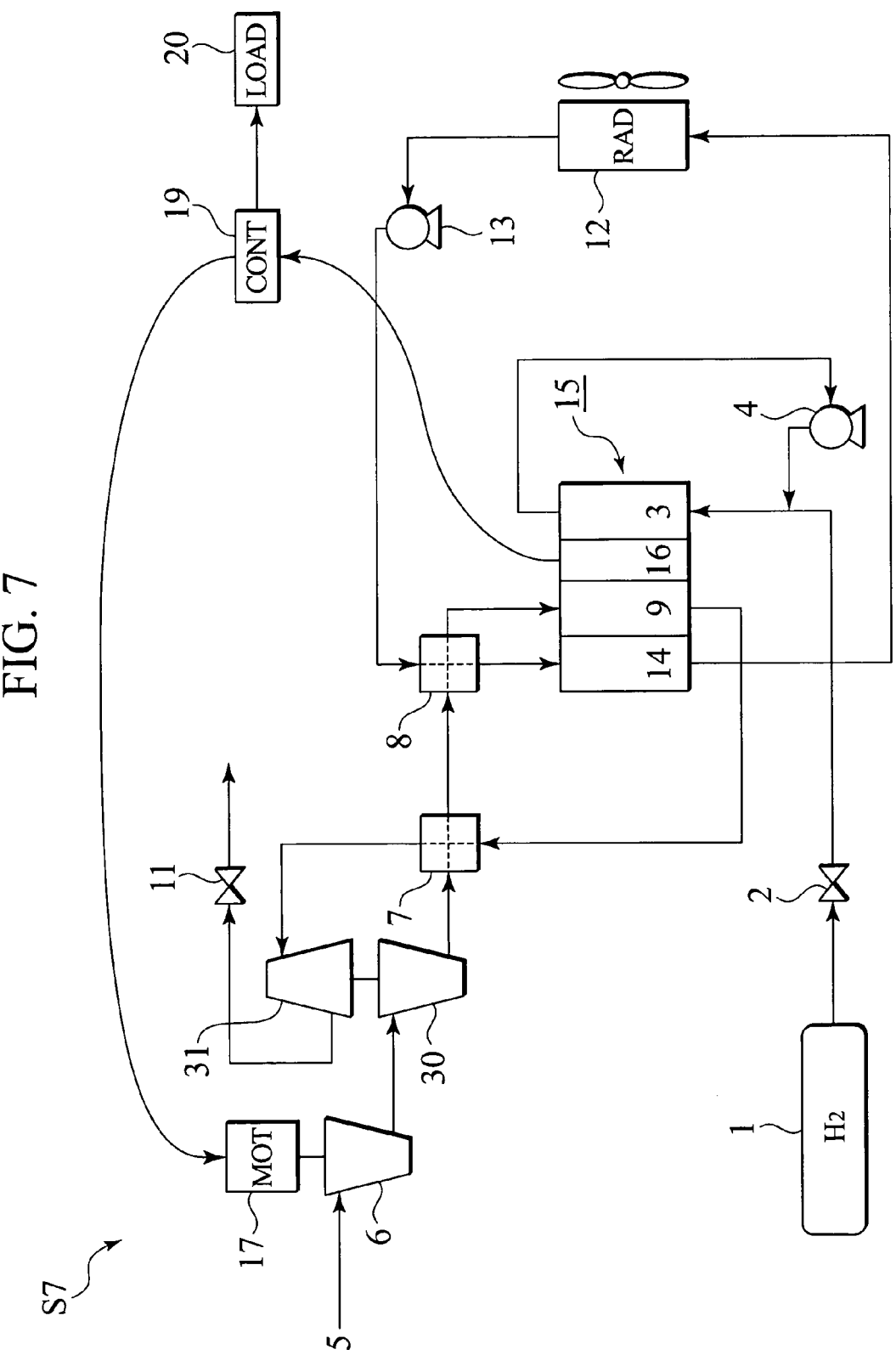
FIG. 7 is a diagram of a fuel cell system according to a seventh embodiment of the present invention.

FIG. 7 shows a diagram of a fuel cell system S7 according to a seventh embodiment of the present invention.

The fuel cell system S7 includes a turbine 31 and a second compressor 30 driven by this turbine 31 instead of the expander 10 of the fuel cell system S1. The other components are the same as those of the fuel cell system S1, which are given the same numerals, and the repeated description thereof is omitted.

Next, a description will be given of the operation of the fuel cell system S7.

The compressor 6 sucks air from the air intake 5, and the air compressed by the compressor 6 is further compressed to a predetermined operating pressure by the second compressor 30. The air compressed by the second compressor 30 is cooled by the gas-gas heat exchanger 7, further cooled by the liquid-gas heat exchanger 8, and supplied to the air electrode 9 of the fuel cell 15.

The turbine 31 and the second compressor 30 are mechanically coupled to each other, and the second compressor 30 is driven to rotate by a rotational force obtained from the turbine 31.

According to the fuel cell system S7, the energy of the outlet air heated by the gas-gas heat exchanger 7 is recovered by the turbine 31 as the rotational force, which is used for the rotation of the second compressor 30. This contributes to the reduction in the energy consumption of the compressor 6.

Compared with the case of using the expander 10 as in the fuel cell system S1, the turbine 31 and the second compressor 30 can efficiently recover energy for compressing air because no energy conversion causing energy loss is involved.

Note that in each of the fuel cell systems S2 to S6, the combination of the second compressor 30 and the turbine 31 can be used instead of the expander 10 similarly to the fuel cell system S7.

Eighth Embodiment

Figure 8:
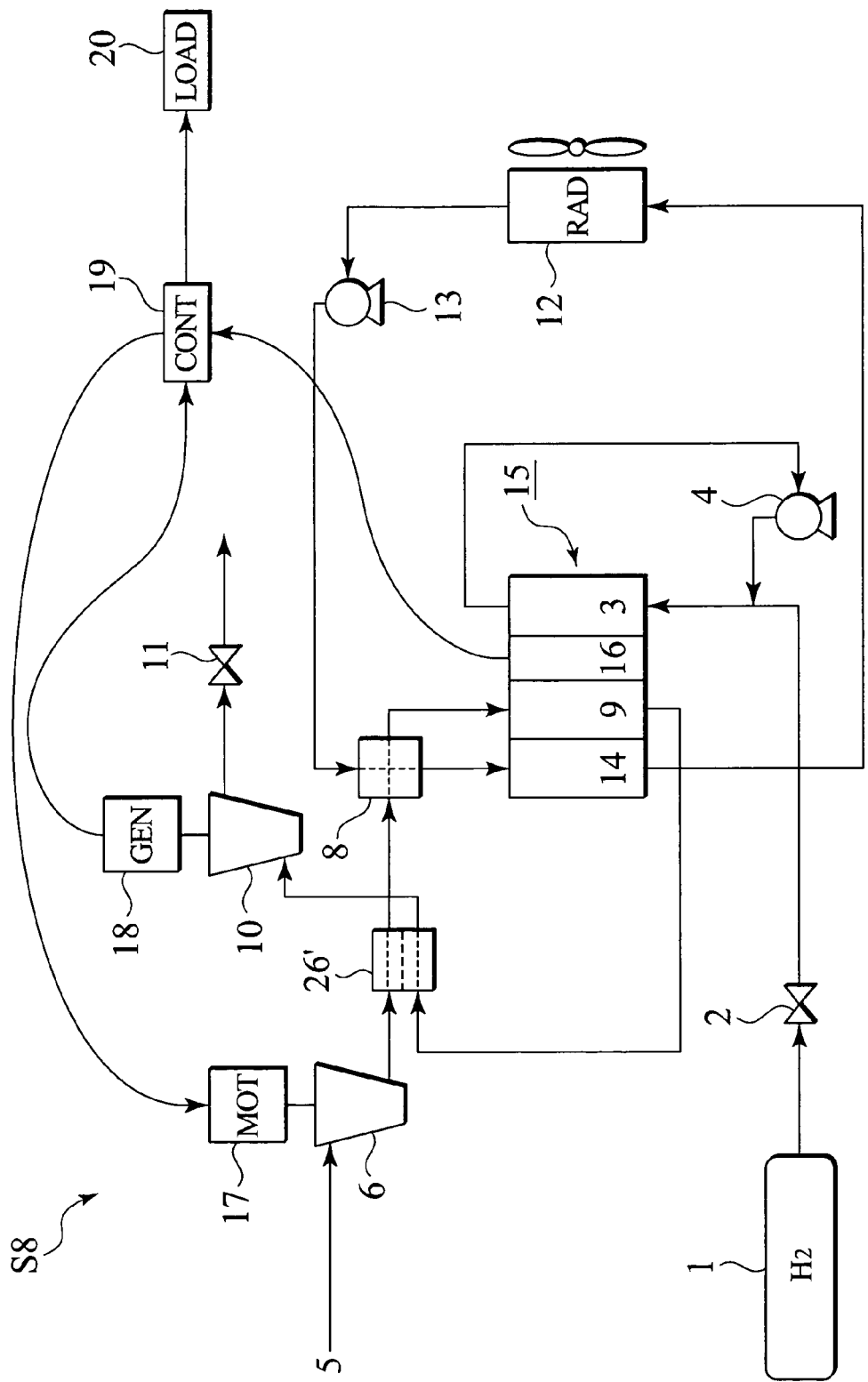
FIG. 8 is a diagram of a fuel cell system according to an eighth embodiment of the present invention.

FIG. 8 shows a diagram of a fuel cell system S8 according to an eighth embodiment of the present invention.

In the fuel cell system S8, a dehumidifier 26' as a moisture exchanging type heat exchanger is used instead of the gas-gas heat exchanger 7 of the fuel cell system S1. The other components are the same as those of the fuel cell system S1, which are given the same numerals, and the repeated description thereof is omitted.

Next, a description will be given of the operation of the fuel cell system S8.

The construction of the dehumidifier 26' is equal to that of the dehumidifier 26 of the fuel cell system S6. With a high heat exchange performance of the dehumidifier 26', the water vapor is transported from the outlet air of the air electrode 9 to the air compressed by the compressor 6, and the compressed air at a temperature raised by the compressor 6 is heat exchanged with and cooled by the outlet air of the air electrode 9. Therefore, the gas-gas heat exchanger 7 can be omitted, thus reducing the costs.

Note that the liquid-gas heat exchanger 8 may be omitted in the case where the dehumidifier 26' has a greater heat exchange performance.

The preferred embodiments described herein are illustrative and not restrictive, and the invention may be practiced or embodied in other ways without departing from the spirit or essential character thereof. For example, the circulating pump 4 can be replaced with an ejector, or the circulation system of the fuel gas may not be included in the system. Further, the hydrogen tank can be replaced with a fuel reformer.

The scope of the invention is indicated by the claims, and all variations which come within the meaning of claims are intended to be embraced herein.

The present disclosure relates to subject matter contained in Japanese Patent Application No. 2003-089092, filed on Mar. 27, 2003, the disclosure of which is expressly incorporated herein by reference in its entirety.

What is claimed is:

1. A fuel cell system comprising:
   a fuel cell to generate electric power, having a fuel electrode to which a fuel gas is supplied and an air electrode to which air is supplied;
   a compressor for compressing air and supplying the compressed air to the air electrode;
   a cooling water system for cooling the fuel cell with cooling water circulating therethrough, the cooling water system including a radiator for releasing heat of the cooling water, and a liquid-gas heat exchanger for cooling the compressed air to be supplied to the air electrode with the cooling water;
   a gas-gas heat exchanger which cools air discharged from the compressor to be supplied to the liquid-gas heat exchanger with air discharged from the air electrode;
   an expander for expanding air discharged from the gas-gas heat exchanger to recover energy therefrom;
   a compressor driving motor for driving rotation of the compressor;
   a generator being driven by rotation of the expander to generate electric power; and
   a controller for distributing electric power generated by the generator and the fuel cell to the compressor driving motor and a load;
   wherein the rotation of the expander is independent of the rotation of the compressor.

2. The fuel cell system according to claim 1, further comprising:
   a humidifier for adding moisture generated in the fuel cell to an inlet air of the air electrode.

3. The fuel cell system according to claim 2, wherein the humidifier adds moisture in the air discharged from the air electrode, which has been supplied to the expander, to the inlet air of the air electrode.

4. The fuel cell system according to claim 1, further comprising:
   a combustor provided between the gas-gas heat exchanger and the expander, wherein
   the air discharged from the air electrode flows through the gas-gas heat exchanger to the combustor, while a fuel gas discharged from the fuel electrode flows to the combustor, and an exhaust gas of the combustor is supplied to the expander.

5. The fuel cell system according to claim 4, further comprising:
   a humidifier for adding moisture generated in the fuel cell to an inlet air of the air electrode, wherein
   the humidifier adds moisture in the air discharged from the air electrode, which has not been supplied to the combustor, to the inlet air of the air electrode.

6. The fuel cell system according to claim 4, further comprising:
   a humidifier for adding moisture generated in the fuel cell to an inlet air of the air electrode, wherein
   the humidifier adds moisture in the air discharged from the air electrode, which has been supplied to the expander, to the inlet air of the air electrode.

7. The fuel cell system according to claim 1, wherein the gas-gas heat exchanger is capable of moisture exchanging between the air discharged from the air electrode and an inlet air of the air electrode.

8. A fuel cell system comprising:
   a fuel cell to generate electric power, having a fuel electrode to which a fuel gas is supplied and an air electrode to which air is supplied;
   compressing means for compressing air and supplying the compressed air to the air electrode;
   cooling means for cooling the fuel cell with cooling water circulating therethrough, the cooling means including a radiator for releasing heat of the cooling water, and liquid-gas heat exchanging means for cooling the compressed air to be supplied to the air electrode with the cooling water;
   gas-gas heat exchanging means for cooling the air discharged from the compressing means to be supplied to the liquid-gas heat exchanging means with the air discharged from the air electrode;
   expander means for expanding the air discharged from the gas-gas heat exchanging means to recover energy therefrom;
   driving means for driving rotation of the compressing means;
   generator means being driven by rotation of the expander means to generate electric power; and
   control means for distributing electric power generated by the generator means and the fuel cell to the driving means and a load,
   wherein rotation of the expander means is independent of rotation of the compressing means.

9. A method of energy recovery for a fuel cell system which comprises:
   providing a fuel cell to generate electric power, having a fuel electrode to which a fuel gas is supplied and an air electrode to which air is supplied;
   compressing air with a compressor and supplying the compressed air to the air electrode;
   driving the compressor with a driving motor that provides a driving rotation of the compressor; and
   providing a cooling water system for cooling the fuel cell with cooling water circulating therethrough, the cooling water system including a radiator for releasing heat of the cooling water, and a liquid-gas heat exchanger for cooling the compressed air to be supplied to the air electrode with the cooling water,
   performing heat exchange with a gas-gas heat exchanger, wherein the gas-gas heat exchanger cools air discharged from the compressor to be supplied to the liquid-gas heat exchanger with air discharged from the air electrode, expanding the air discharged from the gas-gas heat exchanger with an expander to recover energy therefrom, and providing a generator being driven by rotation of the expander to generate electric power, wherein the rotation of the expander is independent of the rotation of the compressor; and, distributing electric power generated by the generator and the fuel cell to the compressor driving motor and a load with a controller.

* * * * *